United States Patent

[11] 3,601,685

| [72] | Inventor | Edgar Kuhn |
| --- | --- | --- |
| | | Gerlingen, Germany |
| [21] | Appl. No. | 819,018 |
| [22] | Filed | Apr. 24, 1969 |
| [45] | Patented | Aug. 24, 1971 |
| [73] | Assignee | Robert Bosch GmbH |
| | | Stuttgart 1, Germany |
| [32] | Priority | May 2, 1968 |
| [33] | | Germany |
| [31] | | P 17 63 303.3 |

[54] VOLTAGE REGULATOR, PARTICULARLY FOR USE WITH PERMANENT MAGNET VEHICLE-TYPE AC GENERATOR-RECTIFIER COMBINATION
4 Claims, 7 Drawing Figs.

[52] U.S. Cl. .................................................. 322/28,
307/275, 317/33 VR, 317/33 SC, 322/91
[51] Int. Cl. ....................................................... H02p 9/00
[50] Field of Search .......................................... 322/28, 91;
320/71; 317/31, 33 VR, 33 SC; 307/271, 275

[56] References Cited
UNITED STATES PATENTS

| 3,471,716 | 10/1969 | Dinger............................ | 307/275 X |
| 3,260,917 | 7/1966 | Shimwell et al................ | 322/91 UX |
| 3,341,763 | 9/1967 | Noddin............................ | 322/91 X |
| 3,443,197 | 5/1969 | Raver et al..................... | 322/28 X |
| 3,456,182 | 7/1969 | Cummins et al................ | 322/91 X |

*Primary Examiner* — Oris L. Rader
*Assistant Examiner* — H. Huberfeld
*Attorney* — Flynn & Frishauf

ABSTRACT: Controlled semiconductor switches, such as SCR's are connected in parallel to, and with reverse polarity to the rectifier elements of the rectifier system connected to an AC permanent magnet vehicle-type generator, which may generate high voltages upon being driven at high speed and low load. A Zener diode senses overvoltage conditions, the Zener diode being connected to trigger a blocking oscillator to oscillate and to provide sharp triggering pulses to the SCR's, the frequency of oscillations of the blocking oscillator being additional by determined by the output voltage so that the SCR's will be conductive for a longer time, during any half cycle, as output voltage rises above the predetermined value.

FIG.1
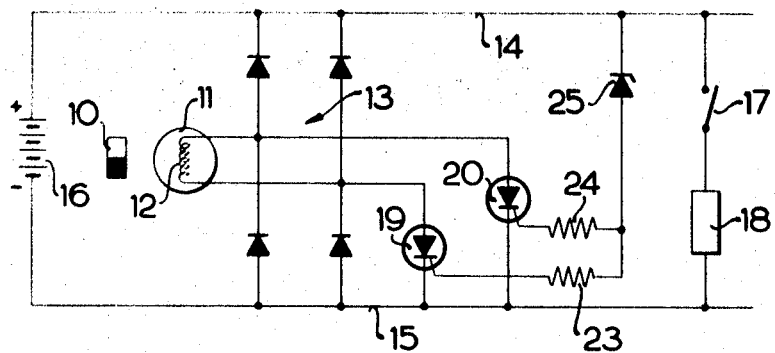
FIG.2
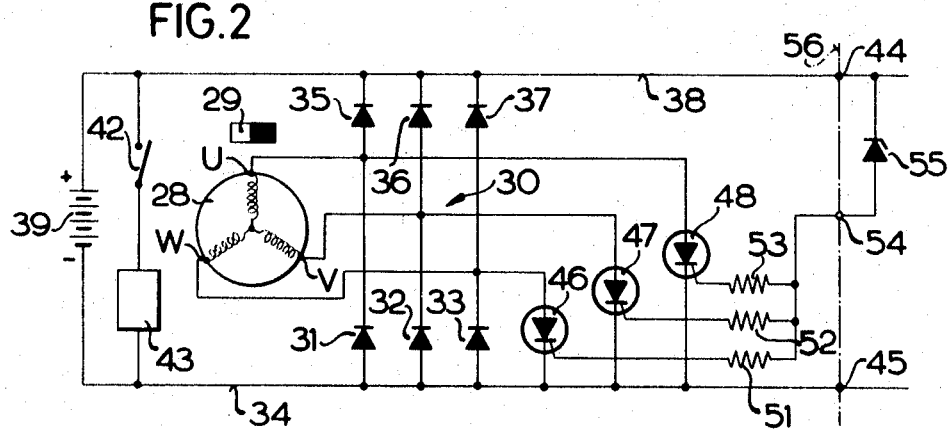
FIG.3 FIG.4 FIG.5
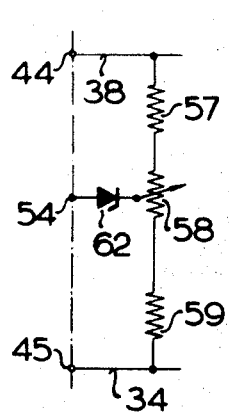 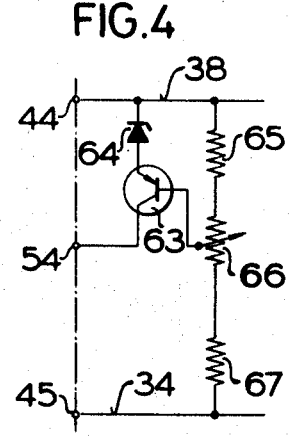 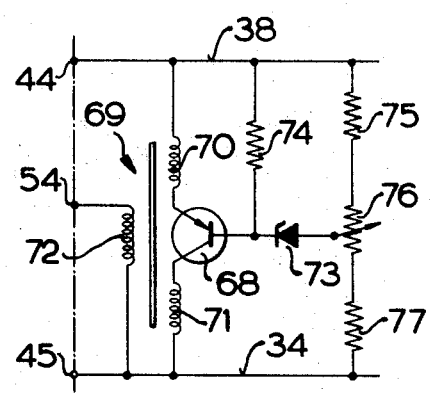
INVENTOR
Edgar KUHN
By
Flynn & Frishauf
his ATTORNEYS INVENTOR
Edgar KUHN
By
Flynn & Frishauf
his ATTORNEYS

VOLTAGE REGULATOR, PARTICULARLY FOR USE WITH PERMANENT MAGNET VEHICLE-TYPE AC GENERATOR-RECTIFIER COMBINATION

The present invention relates to a voltage regulator and more particularly to a voltage regulator for use with a permanent magnet field AC generator connected to supply a direct current network over a rectifier system and particularly suitable for automotive use.

Permanent magnet field generators ate highly reliable and maintenance-free since, other than the bearings for the rotor, the generator does not have any parts which are subject to wear and tear. Permanent magnet field generators are thus ideal for use in vehicles to supply direct current power for the electrical network. Alternating current generators of this type can readily supply the required direct current to charge a battery by connecting the output through rectifier systems. Difficulties do, however, arise with such generators when they are driven with widely varying input speeds and are subject to widely varying loads, since the output voltage of such generators can then vary between wide limits. A generator designed, for example, for a 12-volt nominal output may, when running at high speed and low load, supply an output voltage of over 200 volts. The rectified output voltage of such a generator must thus be regulated downwardly before the generator can be used in a vehicle since, otherwise, any equipment connected to the output of the generator may be destroyed due to the overvoltage. Lamps, as well as transistorized equipment, are particularly sensitive to higher than nominal output voltages.

It has previously been proposed (see, for example, Swiss Pat. No. 403,026) to control the rectified output voltage of such a generator by using rectifying elements which are controllable, and which are connected into a circuit, or so designed that the rectifier will block when the output voltage at the direct current buses becomes too high. The generator then, in effect, runs at idle, without supplying any power. Such an arrangement is satisfactory but requires a substantial number of components and expensive electrical elements, particularly due to the necessary high voltage capacities of semiconductor switches.

It is an object of the present invention to provide a voltage regulator which is simple and reliable and does not require complicated networks nor expensive components.

Subject matter of the present invention: Briefly, controllable semiconductor switches, such as silicon controlled rectifiers (SCR's) are connected in parallel to the rectifier elements of the ordinary semiconductor rectifier connected to the alternator; voltage sensitive sensing means are provided, for example in form of one, or more Zener diodes, which respond when the voltage at the output exceeds a predetermined value, to trigger the SCR to become conductive. The SCR then will form a short circuit for the output of the generator. Short-circuiting the generator causes the voltage to drop to a low value so that no high voltages can occur, and therefore high voltage resistant equipment does not become necessary to switch SCR's capable of carrying the current for high output power, and which require sharp, comparatively large switching pulses, a blocking oscillator is controlled to break into oscillations when the voltage exceeds a predetermined value, for example, by being triggered by conduction of the Zener diode. By connecting the blocking oscillator across the output line of the alternator, the oscillator frequency will be voltage dependent and increase with increasing output voltage so that the SCR's will fire earlier and will tend to remain conductive for a proportionately longer period of time than when triggered by a pulse of lower frequency upon only small excursions of output voltage so that effective control of output voltage preventing undue rise thereof is obtained.

The invention will be described by way of example with reference to the accompanying drawings, wherein:

FIG. 1 is a schematic circuit diagram of a regulator in accordance with the present invention illustrated in combination with a single-phase alternator;

FIG. 2 is a voltage regulator diagram for a three-phase generator;

FIG. 3 is an alternative embodiment of the circuit of FIG. 2;

FIG. 4 is another alternative of the circuit in accordance with FIG. 2;

FIG. 5 is a third alternative of the of the circuit in accordance with FIG. 2;

Figure 6:
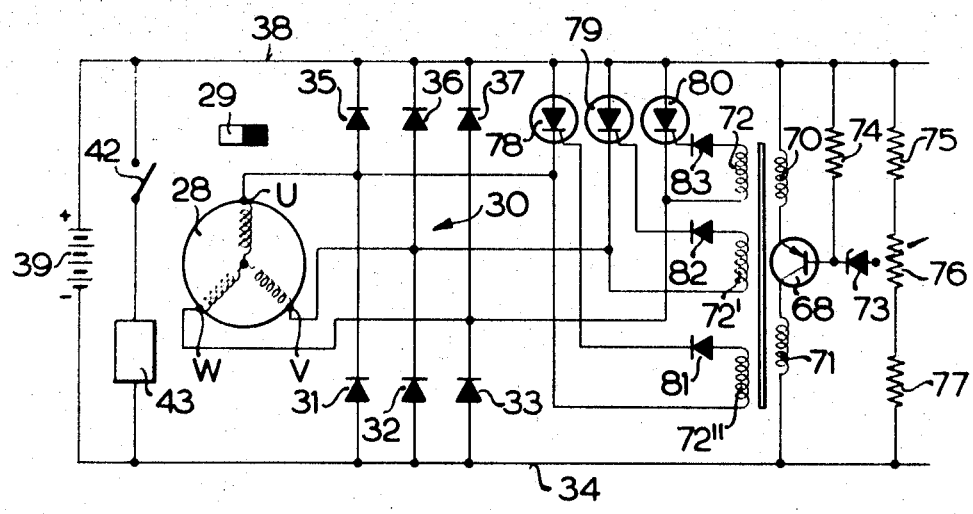
FIG. 6 is a modified circuit for use with a three phase alternator.

A schematically illustrated permanent magnet rotating field 10 (FIG. 1) excites a single-phase generator 11, having an output winding 12 connected to a bridge rectifier 13 and supplying a direct current network having positive and negative buses 14, 15 connected to a battery 16. A switch 17 connects to a load schematically illustrated at 18. A thyristor 19 is connected between an output of armature winding 12 of generator 11 and negative bus 15; a thyristor 20 is connected between the other output of winding 12 and the negative bus 15. Both thyristors form controlled semiconductor switches, the control electrodes of which are connected, respectively, over resistances 23, 24 to the anode of a Zener diode 25 serving as a voltage reference source. The cathode of Zener diode 25 is connected to positive bus 14.

Operation of the circuit according to FIG. 1: Zener diode 25 is blocked if the voltage between buses 14, 15 does not exceed a predetermined value. The control electrodes of the two SCR's 19, 20 do not receive current, voltage of generator 11 is thus supplied to the bridge rectifier 13, which charges battery 16 and is available to supply the load 18 with power. When battery 16 is fully charged and generator 11 is rotated at a higher speed, the voltage between buses 14, 15 may reach a value at which Zener diode 25 becomes conductive. Current will then be supplied to the control electrodes of the SCR's 19, 20, which will become conductive, alternately, as soon as their anode is more positive than their cathode. When SCR 19 is conductive, current will flow from the lower end of winding !12 and the left, lower rectifier element of rectifier 13 to the upper end of winding 12. If SCR 20 is conductive, current will flow from the upper end of winding 12 over SCR 20 and the lower, right rectifier element of the rectifier system 13 to the lower end of winding 12, thus completing the circuit. In both instances, the SCR's 19, 20 serve as a short circuit for winding 12, so that the output voltage will drop to a value of about 1 volt.

The circuit has the advantage that a rectifier element of the rectifier system 13 is always in series with the SCR's 19, 20, so that they are not fully loaded in blocking condition. The voltage on SCR's 19, 20 is limited, in positive direction, by the battery 16, and in negative direction by the diode elements of rectifier 13 connected to the negative bus 15. Thus, the voltage is always clamped to a safe value.

Circuit of FIG. 2: A three-phase generator 28, having armature output terminals U, V, W and a rotating permanent magnet field, schematically illustrated at 29, has its armature windings connected to a three-phase bridge rectifier 30. Three rectifier elements 31, 32, 33 are connected with their anodes to negative bus 34; three rectifier elements 35, 36, 37 are connected with cathodes to positive bus 38. The other terminals of the rectifier elements are connected with the phase terminals U, V, W. As can be seen, the circuit is, basically, similar to FIG. 1. Buses 38, 34 together form a direct current network connected to a battery 39 and, over a switch 42, to a load 43. Bus 38 connects to a junction 44, and bus 34 to a junction 45. Each of the rectifiers 31, 32, 33 is connected in shunt with an SCR 46, 47, 48, respectively, the SCR's being connected with reverse polarity to that of the rectifiers, so that the cathodes of the SCR's are connected to negative bus 34.

The control electrodes of the thyristors are connected over coupling resist 51, 52, 53 to a junction 54 and over the junction to the anode of Zener diode 55, the cathode of which is connected to bus 38 and thus to junction 44.

Operation: Zener diode 55 is blocked if the voltage between buses 34, 38 does not exceed a predetermined value. SCR's 46, 47, 48 are blocked. The output voltage obtained from the connections of the star-connected windings of generator 28 is rectified by the rectifier system 30 and supplied to battery 39 and to the load 43, if connected. If, then, the voltage between buses 34, 38 begins to exceed a predetermined value, Zener diode 55 becomes conductive and the control electrodes of thyristors 46, 47, 48 will be supplied with control current. Coupling resistances 51, 52, 53 provide for uniform distribution of the control current to the various separate thyristors. Thyristors 46, 47, 48, when conductive, together with rectifiers 31, 32, 33 form a short circuit for the output of generator 28. If, for example, phase terminal U is more positive than phase terminal V, current will flow from terminal U over thyristor 48 and rectifier 32 to terminal V; if, however, terminal V is more positive than terminal U, current will flow from terminal V over thyristor 47 and rectifier 31 to terminal U. The output voltage of generator 28 is thereby limited to a low value, so that battery 39 can no longer be charged. If the voltage between the direct current network buses 34, 38 decreases, Zener diode 55 becomes nonconductive, and generator 28 will again provide energy to the network. The switching cycle, that is conduction and blocking of thyristors 46 to 48, and breakdown and blocking of Zener diode 55 will repeat continuously, maintaining the voltage between buses 34, 38 within narrow limits about a median value.

The circuits of FIGS. 3, 4 and 5 illustrate variations of the basic circuit of FIG. 2, and replace the portion of the circuit of FIG. 2 at the right of the chain-dotted line 56 passing through junctions 44, 54, 45. They are to be considered as being connected to these junction points.

FIG. 3: Three resistances 57, 58, 59 form a voltage divider; resistance 58 is a potentiometer having a variable tap point, the tap being connected to Zener diode 62, which is again connected to terminal 54 as before. The operation of the circuit is similar to that previously discussed in connection with FIG. 2; when Zener diode 62, by rise of the voltage between buses 34, 38 becomes conductive, generator 28 is short-circuited. The adjustable tap on resistance 58 enables accurate regulation of the voltage desired. An adjustment is thus possible which could not be done in accordance with the circuit of FIG. 2, in which the output voltage is determined by the breakdown characteristics of Zener diode 55 and the switching potential necessary to turn on the various thyristors 46, 47, 48.

FIG. 4: To compensate for effects of aging of thyristors 46, 47, 48, or for temperature variations, and to further make the circuit essentially independent of the nominal value of the voltage to be regulated, a PNP transistor 63 is provided, having its collector connected to junction 54, its emitter to the anode of Zener diode 64, and its base to a tap point of a voltage divider formed of three resistances 65, 66, 67, which are connected between junctions 44, 45. The cathode of Zener diode 64 is likewise connected to junction 44. In operation, transistor 63 is blocked when the voltage between buses 34, 38 is below a predetermined value, since the Zener diode 64 is nonconductive. If, due to increasing voltage, Zener diode 64 breaks down, base current will flow in transistor 63 to render it conductive, providing control current to the control electrodes of thyristors 46, 47, 48 from positive bus 38 through transistor 63 to the junction point 54. Again, the output of the generator 28 is short-circuited. If the voltage between buses 34, 38 drops, transistor 63 will again block, the voltage will increase, and the switching cycle will continue as before.

FIG. 5: This embodiment is particularly suitable for generators of high output power, in which a higher switching current is necessary to short circuit the thyristors 46 to 48. Such thyristors, to switch to conduction, require sharp switching pulses. Such pulses are generated by a blocking oscillator which has, as active element, a PNP transistor 68, a transformer 69 with three windings 70, 71 72, oscillation of the blocking oscillator being controlled again by a Zener diode 73 connected to a variable tap point on a potentiometer 76, which is connected as part of a voltage divider formed of additional resistances 75, 77, and connected across terminals 44, 45. Winding 70 of the transformer is connected between the emitter of transistor 68 and junction 44; winding 71 between the collector and junction 45; and output winding 72 connects between junctions 45 and 54. The base of the transistor 68 is connected with a cathode of Zener diode 73 and, over a resistance 74, to bus 38 (terminal 44). The anode of the Zener diode is connected to the voltage divider. Operation: When Zener diode 73 is blocked, that is when the voltage between buses 34, 38 is below a predetermined value, transistor 68 is nonconductive. When, upon increase in voltage, Zener diode 73 becomes conductive, transistor 68 will receive base current; this causes collector current to flow which induces a voltage in winding 70 by induction over winding 71, further increasing the collector current until transistor 68 has reached saturation. At that point, the collector current will drop and the output voltage will likewise drop. Transistor 68, with the two coupled windings 70, 71, constantly generates pulses having a frequency of about 15 kHx., which pulses are applied over output winding 72 to the control electrodes of thyristors 46, 47, 48, which become conductive and, as described above in connection with FIG. 2, short circuit generator 28.

Control of the state on conductivity of thyristors 46, 47, 48 in accordance with the examples described in FIGS. 2, 3 and 4, was obtained solely as a result of breakdown of Zener diode 55 (62, 64, respectively) caused by change in voltage between terminals 44, 45. The circuit in accordance with FIG. 5 is additionally sensitive to such change in voltage because the pulse frequency of the clocking oscillators 68, 70, 71, is additionally voltage-sensitive, and depends on the voltage between buses 34, 38 and rises with increasing voltage. Thus, with increasing voltage (and higher frequency) the various separate thyristors are fired earlier and, during each swing of output voltage, they will remain conductive for a proportionately longer period of time than when they are triggered by a lower frequency pulse. In effect, the short circuit current over thyristors 46, 47, 48 will increase with increasing voltage between buses 34, 38.

FIG. 6 illustrates an embodiment of the present invention which is similar to the complete circuit in accordance with FIGS. 2 and 5, and similar parts will not be described again, having been given similar reference numerals. Thyristors 78, 79, 80 are associated with one of the rectifiers 35, 36, 37, and connected thereacross in reverse polarity, so that all the anodes of thyristors 78, 79, 80 are connected to positive bus 38. In addition to the output winding 72, two further output windings 72' and 72'' are provided, which are each connected to the control electrode of one of the thyristors. Diodes 81, 82, 83 are inserted in the connection lines from windings 72, 72', 72'' to the control electrodes. The operation of the circuit is similar to that of the circuit of FIG. 5; upon oscillation of blocking oscillator 68, 70, 71, the output pulses are applied to the thyristor 78, 79, 80 to control them to become conductive and to short circuit generator 28. For example: If phase terminal U is more positive than phase terminal V, current will flow from U over rectifier 35 and thyristor 79 to V. If, reversely, phase terminal V is more positive than phase terminal U, current will flow from V over rectifier 36 and thyristor 78 to U. The current flow in the other phases is analogous. The circuit in accordance with the invention of FIG. 2 requires dimensioning of rectifiers 31, 32, 33 to be sufficiently large to carry the short circuit current of generator 28; the circuit of FIG. 6 requires rectifiers 35, 36, 37 to be able to carry such a current. As is readily apparent, the circuit of FIG. 6 requires a larger and more complicated transformer and additional diodes, so it would be used only when separate control of the various thyristors is desirable.

Figure 7:
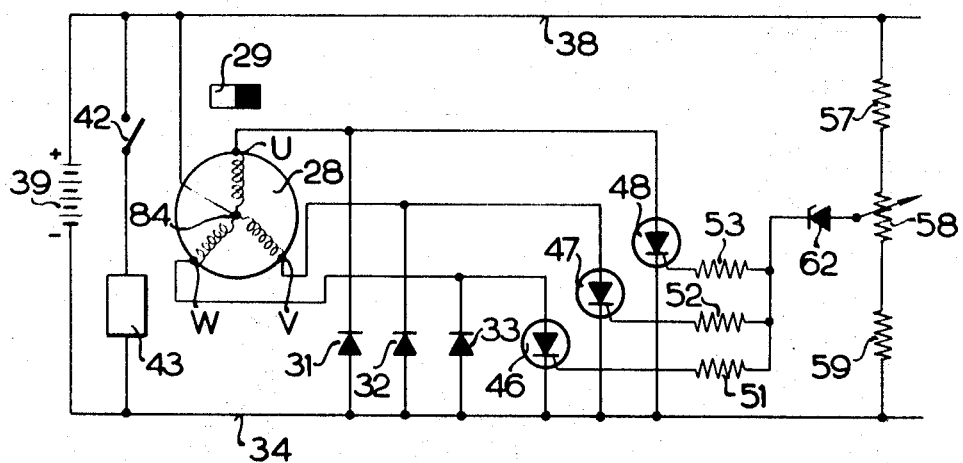
FIG. 7 is a schematic circuit diagram of the voltage regulator of the present invention applied to a three-phase generator having half-wave rectification.

FIG. 7: This circuit is similar to that of FIG. 2, as modified by the circuit of FIG. 4 and again, similar parts will not be described again and have been given the same reference numerals. FIG. 7 illustrates an embodiment of the invention using only three rectifier diodes 31, 32, 33 connected as half-wave rectifiers, the generator itself having its center connection of the star brought out and connected to positive bus 38. In operation, when the voltage between buses 34, 38 is below the critical value, Zener diode 62 is blocked and SCR's 46, 47, 48 are nonconductive; the rectifiers 31, 32, 33 are rectifying in accordance with the well known three-phase half-wave rectification pattern and supply battery 39, as well as load 43 over switch 42. When the DC output voltage between buses 34, 38 exceeds a predetermined critical or threshold value, Zener diode 62 becomes conductive, thus causing SCR's 46, 47, 48 to become conductive, as previously described in connection with FIG. 2, short-circuiting generator 28 and lowering its output voltage to a low value. Voltage between buses 34, 38 will again drop until Zener diode 62 blocks and the short circuit over SCR's 46, 47, 48 is removed, the switching cycle then repeating over and over again. Obviously, the control circuit illustrated in FIGS. 2, 4 and 5 can also be used with the half-wave rectification circuit of FIG. 7.

The present invention has been illustrated and described particularly in connection with a permanent magnet vehicle-type alternator. It is not intended to be limited to the details shown, and various structural changes and modifications as determined by the requirements of particular applications or uses may be made without departing from the inventive concept.

I claim:

1. A voltage regulator for use with permanent magnet AC generators connected to a rectifier system, having rectifier elements (13, 31, 32, 33, 35, 36, 37) and supplying DC supply buses (14, 15, 34, 38, 44, 45), comprising controlled rectifier switch means (19, 20, 46, 47, 48, 78, 79, 80) having their main current paths connected between the output of the generator and one of the DC supply buses;

and means (25, 55, 62, 74, 73) sensing output voltage connected across said supply buses and supplying a signal when said output voltage exceeds a predetermined value, said means including an oscillator (68, 70, 71) connected to the DC supply buses and triggered to oscillation upon appearance of said signal and having a frequency of oscillations dependent on the voltage between said DC supply buses said oscillator having a frequency vs. supply bus voltage characteristic which provides for increasing oscillation frequency as the voltage across said DC supply buses increases; the control electrodes of said controlled rectifiers being connected to the output of said oscillator to control the conduction of said controlled rectifier switch means by applying pulses thereto, said controlled rectifier switch means short-circuiting the output of said generator upon conduction due to application of said pulses.

2. Voltage regulator according to claim 1, wherein the generator is a three-phase generator (28); said rectifier system is a three-phase bridge-type rectifier (30) supplying said DC supply buses and the main current path of a controlled rectifier, each, is connected in parallel to three of the rectifier elements, one each being associated with an output winding of each of the three-phase generators.

3. Voltage regulator according to claim 1, wherein said sensing means is a reference diode (73) connected to sense the voltage between said DC buses, the reference diode being connected to said oscillator to trigger said oscillator to oscillation upon sensing of a voltage between said buses above a predetermined value.

4. Voltage regulator according to claim 1, wherein said oscillator is a blocking oscillator.